Aug. 29, 1939.  H. BARTELS ET AL  2,170,959
PHOTOGRAPHIC CAMERA
Filed April 19, 1937
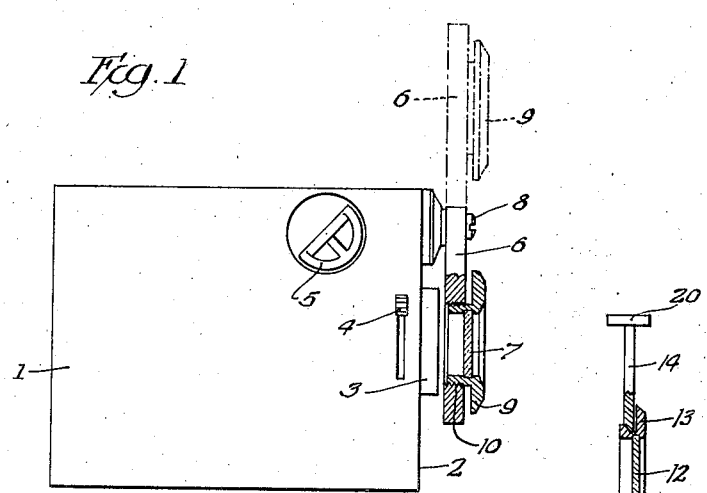
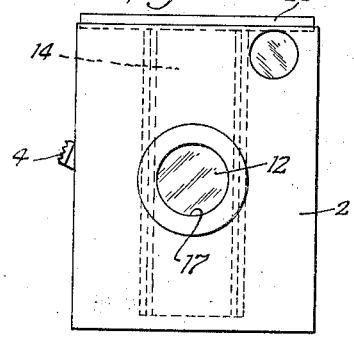
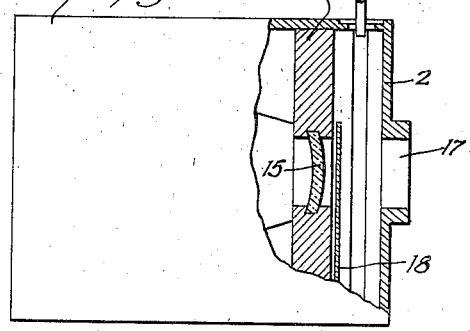
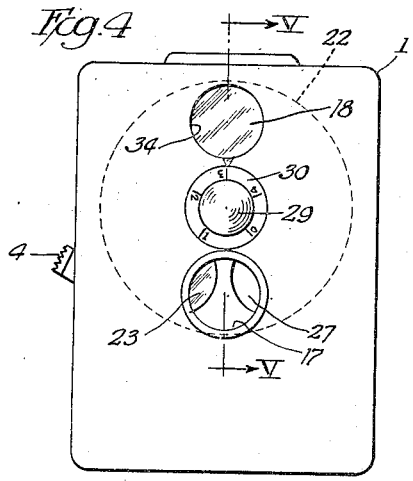
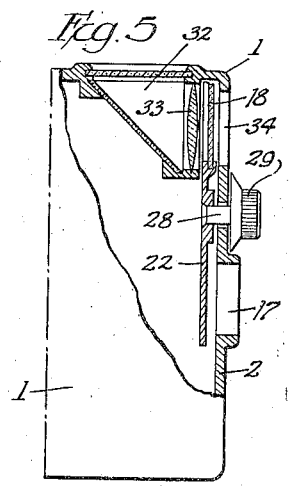
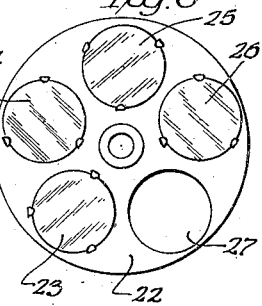
Inventors
Heinrich Bartels
Otto Müller
by B. Singer
Attorney Patented Aug. 29, 1939

2,170,959

UNITED STATES PATENT OFFICE 2,170,959

PHOTOGRAPHIC CAMERA

Heinrich Bartels, Dresden-Laubegast, and Otto Müller, Dresden, Germany, assignors to Zeiss Ikon Aktiengesellschaft, Dresden, Germany Application April 19, 1937, Serial No. 137,790 In Germany April 23, 1936

13 Claims. (Cl. 95—64)

The invention relates to improvements in photographic cameras and in particular is directed to novel arrangements of polarising filters on cameras. Polarising filters are used for eliminating disturbing light reflections and may be used in various forms, for instance, in the form of cemented discs or foils.

It is known to apply polarising filters by means of a mounting ring or the like detachably to the camera in front of the lens or directly on the mounting of the photographic lens. In order to adjust such a polarising filter, it is necessary to remove it from the camera or photographic lens respectively, and place it in front of the eyes of the photographer, who while observing the scene to be photographed through the filter rotates the latter until the disturbing light reflections are diminished or eliminated. Thereupon the polarising filter is again applied to the photographic lens in the same relative position determined by the eyes of the photographer. The picture then taken by the camera is devoid of disturbing light reflections. If another object is to be photographed the polarising filter has to be removed again from the photographic lens for determining the best position at which the disturbing light reflections are eliminated.

It is now the principal object of the invention to avoid the disadvantage of the above described known arrangement, which disadvantage consists principally in this, that the polarising filter has to be continuously detached from and again applied to the photographic lens. In accordance with the invention a single polarising filter is used which selectively may be moved in front of the photographic lens and in front of the eye of the photographer, without the necessity of detaching the polarising filter from the camera or the photographic lens respectively.

In view of the above, it is another object of the invention to provide a carrier for the polarising filter and to attach this carrier in such a manner to the camera casing, that by displacing the carrier the polarising filter may be selectively brought into a position in front of the photographer's eyes or in front of the photographic lens.

Another object of the invention is to arrange the displaceable polarising filter in such a manner that it may be moved into the path of the light rays passing through a finder associated with the camera.

It is also an object of the invention to provide or combine the polarising filters with color filters.

With these and other objects in view, as will appear hereinafter, the invention consists of the novel arrangements, construction of parts and combination of elements described in the following description having reference to the accompanying drawing.

In the drawing:

Fig. 1 is a side elevation view of a box camera equipped with a pivotally mounted polarising filter, which is shown in section.

Fig. 2 illustrates in front elevation a box camera equipped with a modified arrangement of a polarising filter.

Fig. 3 is a side elevation of the camera and the polarising filter illustrated in Fig. 2, partly in section.

Fig. 4 illustrates in front elevation a box camera equipped with another modified arrangement of a polarising filter.

Fig. 5 is a side elevation of the front portion of the camera partly in section, on the line V—V of Fig. 4, and Fig. 6 is a front elevation view of the polariser filter used in the camera illustrated in the Figs. 4 and 5.

In Fig. 1 the box camera I has a front wall 2 provided with a mounting 3 containing the photographic lens (not shown). The shutter actuating member is designated with 4 and the film wind-up member with 5. A carrier 6 for the polarising filter 7 is pivotally mounted at 8 on the front wall 2 of the camera. The carrier 6 is arranged in such a manner, that the polarising filter 7 may be selectively positioned in front of the lens mounting 4, as shown in full lines in Fig. 1, or may be positioned laterally of the camera, for instance upwardly, as shown in dotted lines in Fig. 1. In the latter position the photographer is able to observe the scene to be photographed through the polarising filter 7 and may adjust the same with respect to the carrier 6 until the disturbing light reflections are eliminated. Then the carrier 6 is rotated about its pivot axis at 8 and positioned in front of the lens mounting 3, whereupon the picture may be taken by actuating the shutter.

For the purpose of adjusting the polarising filter 7 it is secured in a mounting ring 9 which is rotatably mounted in an opening of the carrier 6, for instance as shown by a thread 10. When the polarising filter 7, in the dotted line position of the carrier 6, has been rotatably adjusted to a certain angular position, it will assume the same angular position with respect to the lens, when by rotating the carrier 6 about 180° the filter 7 will be arranged in front of the lens as indicated in full lines. Therefore, the undesirable light reflections which appeared eliminated when looking through the polarising filter will likewise appear eliminated from the light sensitive layer which is arranged in the camera behind the lens.

In the modified arrangement of the invention as illustrated by the Figs. 2 and 3, the polarising filter 12 is rotatably adjustably mounted by means of its mounting ring 13 in a carrier 14 which consists of a rectangular plate. This carrier plate 14 is slidably mounted in the camera casing 1 parallel with respect to the front wall 2 of the same and immediately behind this front wall 2. The photographic lens 15 is arranged in a partition wall 16 spaced from the front wall 2, which latter has an aperture 17 in axial alinement with the lens 15. The shutter is indicated at 18 (Fig. 3) and its actuating member with 4 (Fig. 2). A cross bar 20 on the top end of the carrier plate 14 serves as a handle to facilitate the slidable displacement of the polariser 12 from a position in front of the lens 15 to a position outside the camera casing as illustrated in Fig. 3.

The rotative adjustment of the polariser 12 for eliminating disturbing light reflections takes place in the position of the carrier 14 as indicated in Fig. 3. Then the carrier 14 with the adjusted polariser 12 thereon is pushed into the camera and thereby the polariser 12 comes to lie in front of the lens, whereupon the camera is ready for the exposure.

The Figs. 4, 5 and 6 illustrate still another modification of the invention. A circular carrier disc 22 is rotatably arranged within the camera casing 1 directly in rear of the front wall 2. The carrier disc 22 is provided with a number of circumferentially spaced apertures, all but one are provided with a polarising filter 23, 24, 25 and 26 respectively. The polarising filters are fixedly secured in their respective apertures in such a manner that each filter permits the passage of light at a different angle (0 to 180°) with respect to a radial line of the carrier disc 22 which passes through the center point of the respective polarising filter.

The carrier disc 22 is attached to a shaft 28 passing rotatably through the front wall 2 of the camera casing 1 and being provided at its outer end with a knurled operating knob 29 provided with gradations 30. By rotating the knob 29 the carrier disc 22 is rotated and any one of the polarising filters 23 to 26 may be brought in axial alinement with the aperture 17, which as described with reference to Fig. 3 is arranged in front of the photographic lens.

In this last described embodiment the most suitable polarising filter to be placed in front of the lens is determined by bringing the filters one after the other into the path of light passing through the finder 32 which according to Figs. 4 and 5 is arranged in the top portion of the camera. It will be noted from Fig. 5 that the polarising filters 23 to 26 may be brought during the rotation of the carrier disc 22 one at a time in front of the finder lens 33 which is arranged spaced behind an opening 34 in the front wall 2 of the camera.

The operation of this last described modification of the invention is as follows: The photographer observes the scene to be photographed through the finder 32 and by rotating the knob 29 brings one polarising filter after the other in front of the finder lens 33. In this way the filter giving the best results, as far as the elimination of undesirable reflection is concerned, is determined and then is brought in front of the photographic lens or in alinement with the aperture 17 respectively. If a picture without any polarising filter is to be taken, then the carrier disc 22 is rotated until its aperture 27 is brought in alinement with the aperture 17.

The carriers 6, 14 and 22 for the polarising filters may also be constructed in such a manner that the same are provided with color filters. Furthermore, if no separate color filters are desirable, the invention contemplates that the polarising filters may be directly combined with color filters. This can be done, for instance, by providing the carrier of the polarising dichroic material with color filtering properties.

What we claim as our invention is:

1. In a photographic camera having a photographic objective, the arrangement of polarising means, comprising a carrier for said polarising means, said carrier being movably connected with said camera so as to be movable in a plane at a right angle to the axis of the camera objective for positioning said polarising means selectively in the path of the light rays entering the camera, and in the path of light rays between the object to be photographed and the eye of the observer respectively, said carrier supporting said polarising means in both said selective positions so that the polarising plane in both positions has the same angular inclination to the horizontal.

2. In a photographic camera having a photographic objective, the arrangement of polarising means, comprising a carrier for said polarising means, said carrier being movably connected with said camera so as to be movable in a plane at a right angle to the axis of the camera objective for positioning said polarising means selectively in the path of the light rays entering the camera and in a place for permitting the user to observe the object to be photographed through said polarising means, said carrier supporting said polarising means in both said selective positions so that the polarising plane in both positions has the same angular inclination to the horizontal, said polarizing means being mounted rotatably adjustably on said carrier.

3. In a photographic camera having a photographic objective, the arrangement of polarising means, comprising a carrier for said polarising means, said carrier being movably connected with said camera so as to be movable in a plane at a right angle to the axis of the camera objective for positioning said polarising means selectively in the path of the light rays entering the camera and in a place for permitting the user to observe the object to be photographed through said polarising means, said carrier supporting said polarising means in both said selective positions so that the polarising plane in both positions has the same angular inclination to the horizontal and means for mounting said polarising means for rotary adjustment on said carrier.

4. In a photographic camera provided with a camera casing having a front wall, the arrangement of polarising means, comprising a carrier for said polarising means, said carrier being mounted for movement in a plane parallel to said front wall for positioning said polarising means selectively in the path of the light rays entering said camera and in a place for permitting the user to observe the object to be photographed through said polarising means said carrier supporting said polarising means in both said selective positions so that the polarising plane in both positions has the same angular inclination to the horizontal.

5. In a photographic camera provided with a camera casing having a front wall, the arrangement of polarising means, comprising a carrier for said polarising means, said carrier being mounted for rotative movement in a plane parallel to said front wall for positioning said polarising means selectively in the path of the light rays entering said camera and in a place for permitting the user to observe the object to be photographed through said polarising means said carrier supporting said polarising means in both said selective positions so that the polarising plane in both positions has the same angular inclination to the horizontal.

6. In a photographic camera provided with a camera casing having a front wall, the arrangement of polarising means, comprising a carrier for said polarising means, said carrier being mounted for slidable movement in a plane parallel to said front wall for positioning said polarising means selectively in the path of the light rays entering said camera and outside the camera for permitting the user to observe the object to be photographed through said polarising means said carrier supporting said polarising means in both said selective positions so that the polarising plane in both positions has the same angular inclination to the horizontal, said polarising means being rotatably adjustably mounted on said slidable carrier for varying the angular position of the polarising plane with respect to the horizontal.

7. In a photographic camera provided with a camera casing having a front wall, the arrangement of polarising means, including a carrier for said polarising means supported for rotary movement on said front wall, said carrier being provided for moving said polarising means selectively into the path of the light rays entering the camera and in a position for permitting the user to observe the object to be photographed through said polarising means said carrier supporting said polarising means in both said selective positions so that the polarising plane in both positions has the same angular inclination to the horizontal.

8. In a photographic camera provided with a camera casing having a front wall, the arrangement of polarising means, including a carrier for said polarising means supported for rotary movement on said front wall, said carrier being provided for moving said polarising means selectively into the path of the light rays entering the camera and in a position for permitting the user to observe the object to be photographed through said polarising means, and means for mounting said polarising means for rotary adjustment on said carrier in a plane parallel to the front wall of the camera.

9. In a photographic camera provided with a camera casing having a front wall, the arrangement of polarising means, including a rotatable carrier supported for rotative movement on said front wall, and a plurality of polarising filters mounted on said rotatable carrier in a plane parallel to the front wall of the camera and uniformly spaced radially from the axis of rotation of said carrier, said polarising filters upon rotation of said carrier being adapted to be moved selectively one at a time into the path of light entering the camera and into a position to permit the user to observe the object to be photographed through the selected polarising filter.

10. In a photographic camera provided with a camera casing having a front wall, the arrangement of polarising means including a rotatable carrier within said casing and supported for rotative movement on said front wall, and a plurality of polarising filters mounted on said rotatable carrier in a plane parallel to the front wall of the camera and uniformly spaced radially from the axis of rotation of said carrier, said polarising filters upon rotation of said carrier being adapted to be moved selectively one at a time into the path of light entering the camera and into a position to permit the user to observe the object to be photographed through the selected polarising filter, and means arranged at the outside of said casing and connected with said carrier for effecting rotation of the same.

11. In a photographic camera provided with a camera casing having a front wall and a finder, the arrangement of polarising means, including a rotatable carrier supported for rotative movement on said front wall, and a plurality of polarising filters mounted on said rotatable carrier in a plane parallel to the front wall of the camera and uniformly spaced radially from the axis of rotation of said carrier being adapted to be moved selectively one at a time into the path of the light rays entering the camera and into the path of the light rays entering said finder.

12. In a photographic camera provided with a camera casing having a front wall, the arrangement of polarising means, including a rotatable carrier supported for rotative movement on said front wall, and a plurality of polarising filters mounted on said rotatable carrier in a plane parallel to the front wall of the camera and uniformly spaced radially from the axis of rotation of said carrier, said polarising filters upon rotation of said carrier being adapted to be moved selectively one at a time into the path of light entering the camera and into a position to permit the user to observe the object to be photographed through the selected polarising filter, the arrangement of the polarising filters on said carrier being such, that the polarising plane of each filter forms a different angle with respect to a plane passing through the center of the carrier and the center of the respective filter.

13. In a photographic camera with a camera casing having a front wall and a filter, the arrangement of polarising means including a rotatable carrier supported for rotative movement on said front wall, and a plurality of polarising filters mounted on said rotatable carrier in a plane parallel to the front wall of the camera and uniformly spaced radially from the axis of rotation of said carrier, said polarising filter upon rotation of said carrier being adapted to be moved selectively one at a time into the path of the light rays entering the camera and into the path of the light rays entering said finder, the arrangement of the polarising filters on said carrier being such, that the polarising plane of each filter forms a different angle with respect to a plane passing through the center of the carrier and the center of the respective filter.

HEINRICH BARTELS.
OTTO MÜLLER.